US012562917B2

(12) United States Patent
Shbita et al.

(10) Patent No.: US 12,562,917 B2
(45) Date of Patent: Feb. 24, 2026

(54) IMPLEMENTING PERSONAL KNOWLEDGE GRAPHS

(71) Applicant: International Business Machines Corporation, Armonk, NY (US)

(72) Inventors: Basel Shbita, Los Angeles, CA (US); Anna Lisa Gentile, San Jose, CA (US); Chad Eric Deluca, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 18/344,284

(22) Filed: Jun. 29, 2023

(65) Prior Publication Data

US 2025/0007723 A1    Jan. 2, 2025

(51) Int. Cl.
| | |
|---|---|
| *H04L 9/32* | (2006.01) |
| *G06F 16/21* | (2019.01) |
| *G06F 16/22* | (2019.01) |
| *G06F 16/2458* | (2019.01) |
| *G06F 16/28* | (2019.01) |
| *G06F 16/901* | (2019.01) |
| *G06F 16/953* | (2019.01) |
| *H04L 9/00* | (2022.01) |

(52) U.S. Cl.
CPC ............ *H04L 9/3242* (2013.01); *G06F 16/21* (2019.01); *G06F 16/22* (2019.01); *G06F 16/2458* (2019.01); *G06F 16/28* (2019.01); *G06F 16/901* (2019.01); *G06F 16/953* (2019.01); *H04L 9/3213* (2013.01); *H04L 9/3234* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 8,250,048 B2 | 8/2012 | Yalamanchi et al. | |
| 9,602,513 B2 | 3/2017 | Gamage et al. | |

(Continued)

FOREIGN PATENT DOCUMENTS

| | | | | |
|---|---|---|---|---|
| CN | 111314318 A | 6/2020 | | |
| CN | 113987202 A * | 1/2022 | ........... | G06F 40/232 |

(Continued)

OTHER PUBLICATIONS

Jonathan Hayes (A Graph Model for RDF); pp. 145; Aug. 31, 2004.*

(Continued)

*Primary Examiner* — Ali H. Cheema
(74) *Attorney, Agent, or Firm* — Patterson + Sheridan, LLP

(57) ABSTRACT

Embodiments of the disclosed provide systems and methods for collecting, organizing and managing of personal information for a user and implementing Personal Knowledge (PK) graphs for users in a database system. The system generates a PK graph based on user personal information data for a user and a PK graph model defining a graph data structure with a central node representing the user and one or more nodes representing entities of interest to the user. The system ingests export data from each of the entities of interest based on a model describing the entities. The system integrates the user export data from all the entities of interest into the PK graph to provide an integrated PK graph for the user.

17 Claims, 6 Drawing Sheets

(56) References Cited

U.S. PATENT DOCUMENTS

| | | | |
|---|---|---|---|
| 9,940,472 B2 | 4/2018 | Akkiraju et al. | |
| 11,120,150 B2 | 9/2021 | Ravizza et al. | |
| 11,222,298 B2 | 1/2022 | Abelow | |
| 11,295,216 B2 | 4/2022 | Lindsley | |
| 11,928,145 B1 * | 3/2024 | Shi | G06V 10/84 |
| 2009/0097418 A1 | 4/2009 | Castillo et al. | |
| 2015/0135261 A1 | 5/2015 | Park et al. | |
| 2016/0163311 A1 * | 6/2016 | Crook | G10L 15/183 |
| | | | 704/275 |
| 2016/0224637 A1 * | 8/2016 | Sukumar | G06F 16/2465 |
| 2018/0052842 A1 | 2/2018 | Hewavitharana et al. | |
| 2018/0052884 A1 | 2/2018 | Kale et al. | |
| 2018/0052885 A1 | 2/2018 | Gaskill et al. | |
| 2018/0082183 A1 * | 3/2018 | Hertz | G06Q 10/10 |
| 2019/0099653 A1 * | 4/2019 | Wanke | A63B 24/0062 |
| 2019/0278777 A1 * | 9/2019 | Malik | G06F 16/9024 |
| 2020/0057946 A1 | 2/2020 | Singaraju et al. | |
| 2020/0081445 A1 * | 3/2020 | Stetson | G05D 1/0221 |
| 2021/0042438 A1 * | 2/2021 | Scheideler | G06F 16/9024 |
| 2021/0258336 A1 * | 8/2021 | Clifford | H04L 63/102 |
| 2022/0070292 A1 * | 3/2022 | Casal | G06F 18/214 |
| 2023/0094042 A1 * | 3/2023 | Lavery | G06F 16/90332 |
| | | | 715/212 |
| 2023/0153355 A1 * | 5/2023 | Crabtree | G06F 18/29 |
| | | | 706/45 |
| 2023/0161742 A1 * | 5/2023 | Kanagaraj | G06F 16/9024 |
| | | | 707/736 |
| 2023/0237095 A1 * | 7/2023 | Albasha | G06F 16/9024 |
| | | | 707/798 |
| 2023/0325884 A1 * | 10/2023 | Liu | G06Q 30/0239 |
| | | | 705/14.66 |
| 2023/0350861 A1 * | 11/2023 | Ye | G06N 20/00 |
| 2025/0233883 A1 * | 7/2025 | Thompson | H04L 9/50 |

FOREIGN PATENT DOCUMENTS

| | | | | | |
|---|---|---|---|---|---|
| CN | 115237967 A | * | 10/2022 | | G06F 16/288 |
| JP | 2024085624 A | * | 6/2024 | | G06F 16/23 |
| WO | WO-2022140900 A1 | * | 7/2022 | | G06F 16/953 |

OTHER PUBLICATIONS

Zyskind, Guy, and Oz Nathan. "Decentralizing privacy: Using blockchain to protect personal data." 2015 IEEE Security and Privacy Workshops. IEEE, Year: 2015, pp. 1-5.
Balog, Krisztian, and Tom Kenter. "Personal knowledge graphs: A research agenda." Proceedings of the 2019 ACM SIGIR International Conference on Theory of Information Retrieval. Year: 2019, pp. 1-4.
Chaudhry, Amir, et al. "Personal data: thinking inside the box." Year: 2015, pp. 1-4.
Faber, Benedict, et al. "BPDIMS: A blockchain-based personal data and identity management system." Year: 2019, pp. 1-10.
Kalokyri, Varvara, Alexander Borgida, and Amélie Marian. "Yourdigitalself: A personal digital trace integration tool." Proceedings of the 27th ACM International Conference on information and knowledge management. Year: 2018, pp. 1-4.
Li, Xiang, et al. "Personal knowledge graph population from user utterances in conversational understanding." 2014 IEEE Spoken Language Technology Workshop (SLT). IEEE, Year: 2014, pp. 1-6.
Lin et al. "PKG: A personal knowledge graph for recommendation." Proceedings of the 45th International ACM SIGIR Conference on Research and Development in Information Retrieval. Year: 2022, pp. 1-5.
Montoya, David, et al. "A knowledge base for personal information management." LDOW2018—Linked Open Data Workshop at the World Wide Web Conference. Year: 2018, pp. 1-10.
Richard Mortier et al., "Personal Data Management with the Databox: What's Inside the Box?," CAN '16: Proceedings of the 2016 ACM Workshop on Cloud-Assisted Networking, Dated: Dec. 2016, pp. 49-54 [Abstract Only].

Gus Schreiber et al., "RDF 1.1 Primer: W3C Working Group Note," W3C, Dated: Jun. 24, 2014, pp. 1-14.
Schroder, Markus, Christian Jilek, and Andreas Dengel. "A Human-in-the-Loop Approach for Personal Knowledge Graph Construction from File Names." Proceedings of the 3rd International Workshop on Knowledge Graph Construction. Year: 2022, pp. 1-15.
Nguyen Binh Truong et al., "GDPR-Compliant Personal Data Management: A Blockchain-based Solution," arXiv.org, Dated: Oct. 3, 2019, pp. 1-16.
Vertesi, Janet, et al. "Data Narratives: Uncovering tensions in personal data management." Proceedings of the 19th ACM conference on Computer-Supported cooperative work & social computing. Year: 2016, pp. 1-13.
Aidan Hogan, Eva Blomqvist, Michael Cochez, Claudia d' Amato, Gerard de Melo, Claudio Gutierrez, Sabrina Kirrane, Jose Emilio Labra Gayo, Roberto Navigli, Sebastian Neumaier, Axel-Cyrille Ngonga Ngomo, Axel Polleres, Sabbir M. Rashid, Anisa Rula, Lukas Schmelzeisen, Juan Sequeda, Steffen Staab, Antoine Zimmermann (2021) Knowledge Graphs, Synthesis Lectures on Data, Semantics, and Knowledge, No. 22, 1-237, DOI: 10.2200/S01125ED1 V0I Y202109DSK022, Springer.
Saurabh Shrivastava, "Bring rich knowledge of people, places, things and local buisnesses to your apps," Microscoft Bing Blogs, Dated: Jul. 12, 2017, pp. 1-4.
Amit Singhal, "Introducing the Knowledge Graph: things, not strings," Google, Dated: May 16, 2012, pp. 1-5.
Spencer Chang, "Scaling Knowledge Access and Retrieval at Airbnb: Introducing our Knowledge Graph for encoding relationships and surfacing relevant information," The Airbnb Tech Blog, Dated: Sep. 4, 2018, pp. 1-20.
Arun Krishnan, "Making search easier," Amazon, Dated: Aug. 17, 2018, pp. 1-4.
X. L. Dong, "Building a Broad Knowledge Graph for Products," 2019 IEEE 35th International Conference on Data Engineering (ICDE), Macao, China, 2019, pp. 25-25, doi: 10.1109/ICDE.2019. 00010. [Abstract Only].
RJ Pittman, "Cracking the Code on Conersational Commerce," ebay, Dated: Apr. 6, 2017, pp. 1-8.
Ferras Hamad et al., "Food Discovery with Uber Eats: Building a Query Understanding Engine," Uber Blog, Dated: Jun. 10, 2018, pp. 1-15.
Natasha Noy et al., "Industry-scale Knowledge Graphs," Queue, vol. 17, Issue 2, dated: Mar.-Apr. 2019, pp. 1-28.
Qi He et al., "Building the LinkedIn Knowledge Graph," Lindkedin, Dated: Oct. 6, 2016, pp. 1-8.
Okorafor et al., "Customer Experience: Introduction to Customer Experience," Accenture, Year: 2019, pp. 1-14.
L. Bellomarini, D. Fakhoury, G. Gottlob and E. Sallinger, "Knowledge Graphs and Enterprise AI: The Promise of an Enabling Technology," 2019 IEEE 35th International Conference on Data Engineering (ICDE), Macao, China, 2019, pp. 26-37, doi: 10.1109/ICDE.2019.00011. [Abstract Only].
Edgar Meij, "Understanding News Using the Bloomberg Knowledge Graph," Bloomberg, Datd: May 14, 2019, pp. 1-22.
Branum et al., "Knowledge Graph Pilot Improves Data Quality While Providing a Customer 360 View," Columbia SPS, Year: 2019 https://www.youtube.com/watch?v=ABN2377ER_A.
David Newman, "Knowledge Graphs and AI: The Future of Financial Data," The Knowledge Graph Conference, Year: 2019, pp. 1-5.
"Thomson Reuters Launches first of its kind Knowledge Graph Feed allowing Financial Services customers to accelerate their AI and Digital Stragegies," Thomson Reuters, Dated: Oct. 23, 2017, pp. 1-3.
Rehman et al., "Mining Personal Data Using Smartphones and Wearable Devices: A Survey," Sensors 2015, 15, 4430-4469.
Jason L. Frand, "Personal Knowledge Management: Who? What? Why? When? Where? How?," Anderson Graduate School of Management at UCLA, Dated: Oct. 15, 1998, pp. 1-63.
Amelie Gyrard et al, "Personalized Health Knowledge Graph," HHS Public Access, Dated: Oct. 2018, pp. 1-9.
Dan McCreary, Personal Knowledge Graphs, Toward Data Science, Date Accessed: Jul. 27, 2022, pp. 1-9.

(56)          References Cited

OTHER PUBLICATIONS

Sudarshan Chavan, "Music Streaming Application using Blockchain," IEEE, Year: 2019, pp. 1035-1040.

I. Lourentzou et al. "Mining Relations from Unstructured Content," Springer International Publishing, Year: 2018, pp. 363-375.

P. Mohammadi Gheshlsgh et al., "Providing a Model for Promoting Personal Knowledge Management (PKM) in Teachers: an Applied Research, Grounded Theory Approach," Journal of New Approaches in Educational Adminstration; 13(1): 50-64.

L. Vannur et al., "Data Augmentation for Fairness in Personal Knowledge Base Population," Springer, Year: 2021, pp. 143-152.

Emma J. Gerritse et al., Bias in Conversational Search: The Double-Edged Sword of the Personalized Knowledge Graph, ICTIR '20, Dated: Sep. 14-17, 2020, pp. 133-136.

L. Vannur et al., "Data Augmentation for Personal Knowledge Base Population," arXiv.org, Dated: Aug. 18, 2020, pp. 1-8.

Cory Henson et al., "Using a Knowledge Graph of Scenes to Enable Search of Autonomous Driving Data," CEUR-WS.org, date accessed: Jun. 23, 2023, pp. 1-2.

Butcher Mike. "GraphPath Plans to Combine Knowledge Graphs with the Blockchain", Techcrunch, May 14, 2018, 3 Pages.

Cagle Kurt. "The Coming Merger of Blockchain and Knowledge Graphs", Medium, Nov. 12, 2019, 10 Pages.

Decker Stephen. "ChatGPT . . . an Arms Race between Large Language Models and Knowledge Graphs?", Experiments with ChatGPT, Linkedin, Dec. 20, 2022, 8 Pages.

Li, et al., "Blockchain-as-a-Service Powered Knowledge Graph Construction", Knowledge Science, Engineering and Management, Aug. 7, 2021, 12 Pages.

Yao, et al., "Convergence of Blockchain, Autonomous Agents, and Knowledge Graph to Share Electronic Health Records", Frontiers Blockchain, Apr. 6, 2021, 7 Pages.

\* cited by examiner

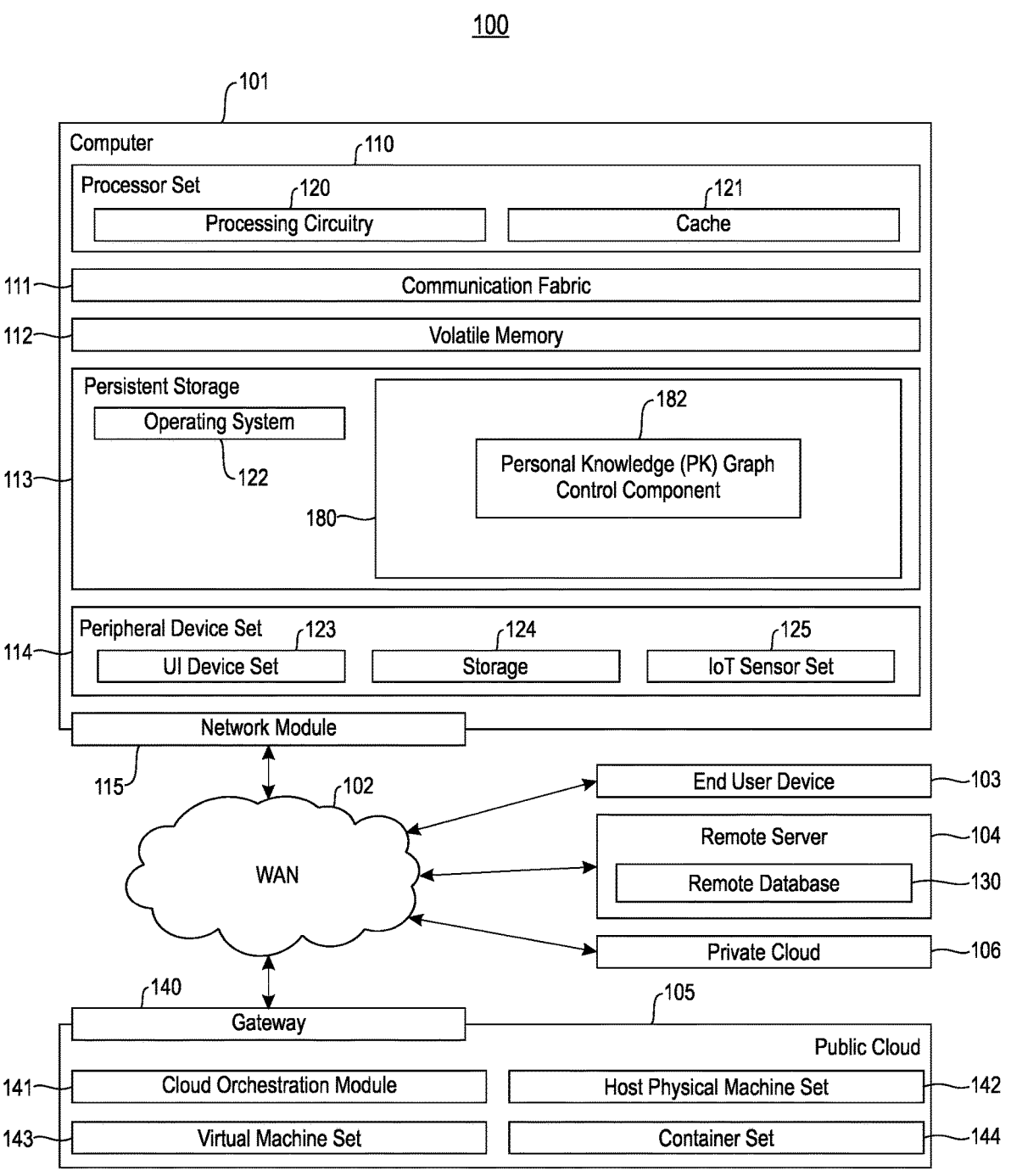

100

101

Computer
110

Processor Set
120
Processing Circuitry

121
Cache

111 — Communication Fabric

112 — Volatile Memory

113 — Persistent Storage

Operating System
122

182

180

Personal Knowledge (PK) Graph Control Component

114 — Peripheral Device Set
123
UI Device Set

124
Storage

125
IoT Sensor Set

Network Module

115

102

WAN

End User Device — 103

Remote Server — 104

Remote Database — 130

Private Cloud — 106

140
Gateway

105

Public Cloud

141 — Cloud Orchestration Module

Host Physical Machine Set — 142

143 — Virtual Machine Set

Container Set — 144

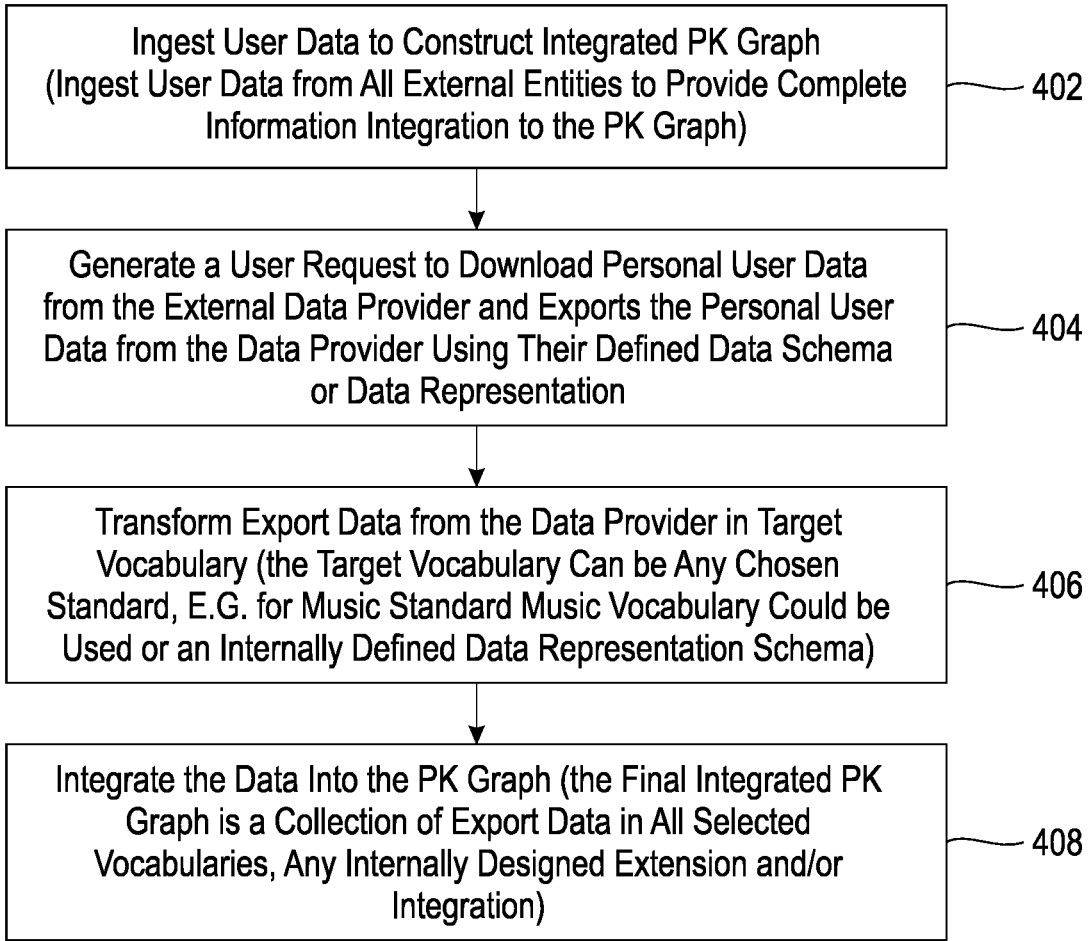

Ingest User Data to Construct Integrated PK Graph
(Ingest User Data from All External Entities to Provide Complete
Information Integration to the PK Graph) — 402

Generate a User Request to Download Personal User Data
from the External Data Provider and Exports the Personal User
Data from the Data Provider Using Their Defined Data Schema
or Data Representation — 404

Transform Export Data from the Data Provider in Target
Vocabulary (the Target Vocabulary Can be Any Chosen
Standard, E.G. for Music Standard Music Vocabulary Could be
Used or an Internally Defined Data Representation Schema) — 406

Integrate the Data Into the PK Graph (the Final Integrated PK
Graph is a Collection of Export Data in All Selected
Vocabularies, Any Internally Designed Extension and/or
Integration) — 408

Provide Approved Readers to Share Data Using PK Graph (E.G., User Can Provide Sharing Access Key as Digital Signature) —— 502

Define Sharing Rights on Each Node and Edge in the PK Graph —— 504

Transform Data in API Requests for External Service Providers —— 506

Send Requests to External Service Providers to Enable Data Sharing —— 508

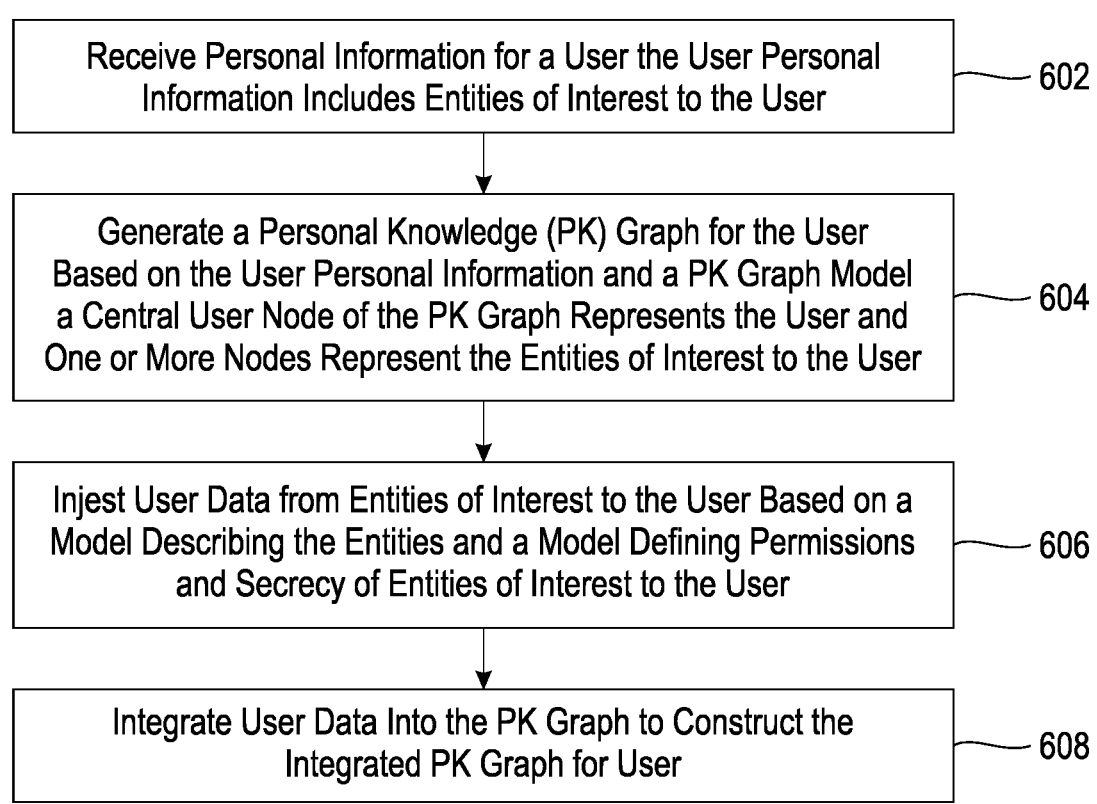

600

| Receive Personal Information for a User the User Personal Information Includes Entities of Interest to the User | ⟋ 602 |

| Generate a Personal Knowledge (PK) Graph for the User Based on the User Personal Information and a PK Graph Model a Central User Node of the PK Graph Represents the User and One or More Nodes Represent the Entities of Interest to the User | ⟋ 604 |

| Injest User Data from Entities of Interest to the User Based on a Model Describing the Entities and a Model Defining Permissions and Secrecy of Entities of Interest to the User | ⟋ 606 |

| Integrate User Data Into the PK Graph to Construct the Integrated PK Graph for User | ⟋ 608 |

FIG. 6

IMPLEMENTING PERSONAL KNOWLEDGE GRAPHS

BACKGROUND

The present invention relates to digital processing systems, and more specifically, to systems and methods for collecting, organizing, and managing personal knowledge information for a user and implementing Personal Knowledge (PK) graphs for users.

A need exists for a system and method for implementing a personal knowledge (PK) graph for a user including collecting, organizing, and managing personal knowledge information data for the user in a database.

SUMMARY

Disclosed embodiments provide systems and methods for collecting, organizing and managing of personal information for a user and implementing Personal Knowledge (PK) graphs for users in a database system.

A disclosed non-limiting computer implemented method comprises receiving user personal information data for a user and generating a personal knowledge (PK) graph for the user based on the personal information data. The system generates the PK graph based on a PK graph model defining a central node representing the user and one or more nodes representing entities of interest to the user. Each entity node is connected to the central user node by a respective edge in the PK graph. The system ingests user data from each of the entities of interest based on a model describing the entities. The system integrates the user data from all the entities of interest into the PK graph to provide an integrated PK graph for the user.

Other disclosed embodiments include a computer system and computer program product implementing a Personal Knowledge (PK) graph for a user, implementing features of the above-disclosed methods.

BRIEF DESCRIPTION OF THE DRAWINGS

FIG. 1 is a block diagram of an example computer environment for use in conjunction with one or more disclosed embodiments for implementing a Personal Knowledge (PK) graph for a user;

FIG. 4 is a flow chart of example data injecting operations of an example method for implementing a PK graph for a user of one or more disclosed embodiments;

FIG. 6 is a flow chart of an example method for implementing a PK graph for a user of one or more disclosed embodiments.

DETAILED DESCRIPTION

Figure 2:
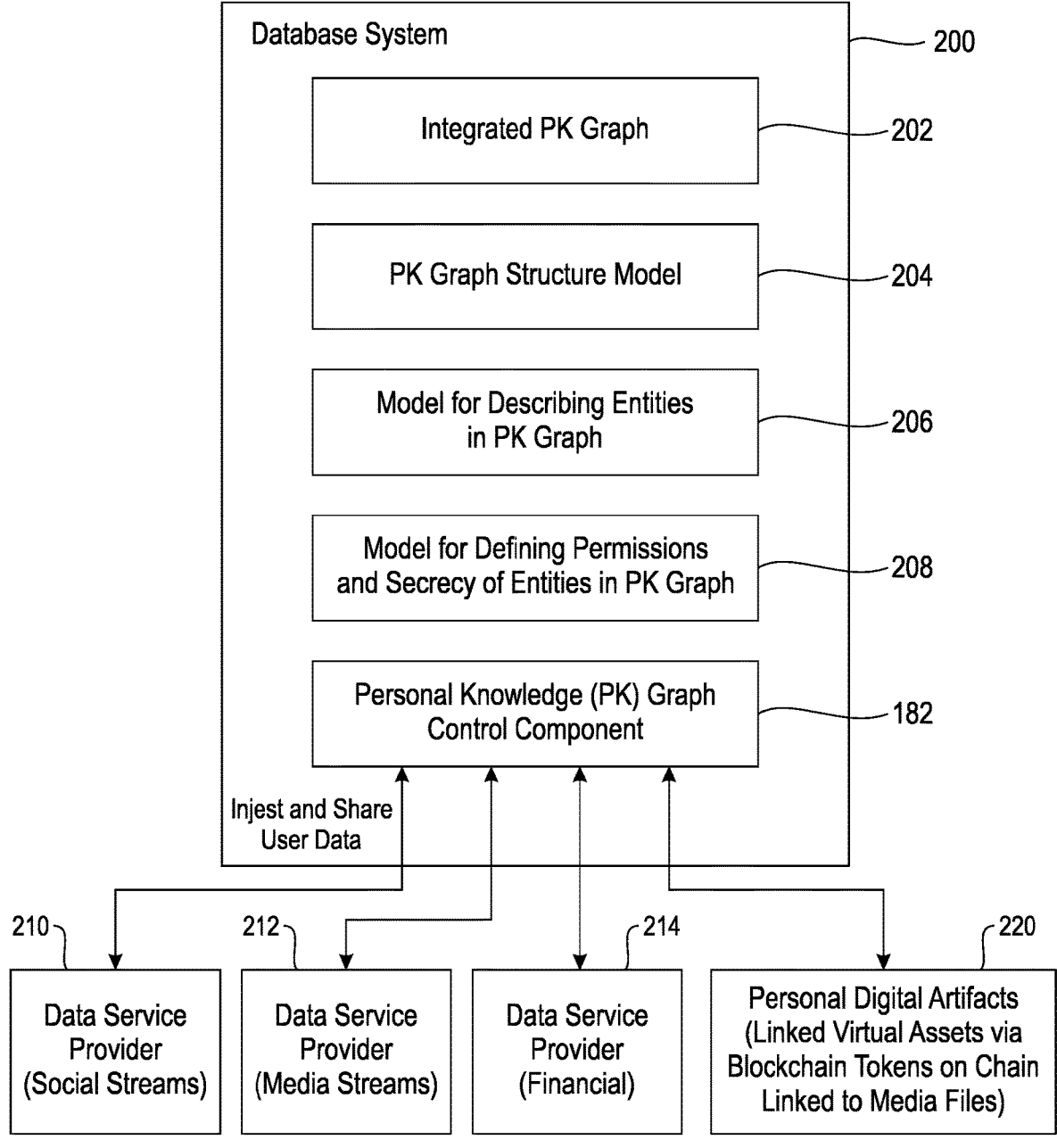
FIG. 2 is a block diagram of an example system for implementing a PK graph for a user of one or more disclosed embodiments.

Disclosed embodiments provide systems and methods for implementing Personal Knowledge (PK) graphs for users in a database system, to enable effective and efficient modeling of a user's personal data information. A PK graph is generated for the user based on received user personal information data and a PK graph model. The PK graph model defines a graph data structure for the PK graph including the user at a center node with a respective edge connected to one or more nodes representing entities of interest to the user. The entities of interest are personally related to the user and may not be of global importance. The system ingests export data from each of the external entities of interest based on a model describing the entities. For example, the external entities a data service provider providing social streams, a media service provider providing video, audio, and book streams, a health insurance service provider, a financial data service provider, and the like. The system integrates the export data from all the external entities of interest into the PK graph based on a model defining permissions and secrecy for each given entity of the external entities to provide an integrated PK graph for the user. In one embodiment, each user has full access to all their personal data and can limit exposure of the personal data to external data service providers and other people. Each user can verify the personal data in their integrated PK graph and to confirm and approve the personal data as being correct. For example, knowledge verification can be encoded in the user's PK graph. In a disclosed embodiment, ingesting export data from the external entities comprises performing an encryption and decryption method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a Personal Knowledge (PK) Graph Control Component 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as BLUETOOTH® connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Disclosed embodiments enable effective and efficient modeling personal knowledge (PK) for a user. A PK graph is generated for the user based on a PK graph model, where the PK graph is data graph structure including the user at a center node with respective edges connecting nodes representing entities of interest to the user. The entities of interest to the user can include multiple service providers that are personally related to the user, such as social and media service providers, financial service providers and the like. The database system provides a model for describing the entities in the PK graph enabling effective integration with external data sources. The database system provides a model for defining permissions and secrecy of entities in the PK graph. The system ingests user data from each of the entities of interest based on the model describing the entities and the model defining permissions and secrecy of the entities. The system integrates the user data from all the entities of interest into the PK graph to provide an integrated PK graph for the user. The system enables data sharing, for example providing sharing rights defined on each node and edge in the PK graph. The system enables robust integration of personal digital artifacts of the user with the PK graph. The personal digital artifacts can include various user files, for example where the user retains copyright such as user documents, photos, audios, videos, and the like. The system enables populating and maintaining the PK graphs for example providing effective and efficient collection of all potential data sources (textual, visual, geolocation) for the user. The system enables usage of the PK graphs for example providing natural language processing, entity and relationship extraction, and information integration.

FIG. 2 illustrates an example database system 200 for collecting, organizing, and managing of personal information for a user to implement a PK graph for a user of disclosed embodiments. Database system 200 can be used in conjunction with the computer 101 and cloud environment of the computing environment 100 of FIG. 1 for implementing an integrated PK graph 202 of disclosed embodiments.

In a disclosed embodiment, the database system 200 enables effective and efficient modeling of personal knowledge for a user. Database system 200 includes a PK graph structure model 204 used for generating the integrated PK graph 202, a model 206 (e.g., or vocabulary) for describing entities in the PK graph 202, and a model 208 (e.g., or vocabulary) for defining permissions and secrecy of entities in the PK graph 202. In a disclosed embodiment, the database system 200 enables integration of multiple external entities of interest to the user, which can include various different data service providers for example that are personally related to the user. As shown, the database system 200 includes a data service provider 210 providing social streams, a media service provider 212 providing video, audio, and book streams, a financial data service provider 214 such as the user's bank, and the like.

In a disclosed embodiment, the PK graph structure model 204 provides a data graph structure defining the integrated PK graph 202 to include the user at a center node with an edge connected to one or more nodes representing entities of interest to the user, such as the service providers 210, 212, and 214. As shown, the database system 200 enables integration of personal digital artifacts 220, for example personal assets of which the user retains copyright protection such as photos, audios, videos, and the like. In a disclosed embodiment, the personal digital artifacts 220 are linked or acquired into the user's integrated PK graph 202 via a blockchain implementation, providing effective robust integration. In a disclosed embodiment, the personal digital artifacts 220 comprise linked virtual assets or tokens on a blockchain, which are linked to media files. For example, the user of the integrated PK graph 202 can use an individual hash key or wallet address owned by the user to retrieve their linked virtual assets and maintain their integrated PK graph 202.

In disclosed embodiment, the PK graph structure model 204 provides a data graph structure where data is represented as a graph, specifically a set of triples, each triple representing a sentence of three parts including a subject, a predicate, and an object. The triples can represent all the facts in the integrated PK graph 202. Database system 200 can enable data sharing, for example providing sharing rights defined on each node and edge in the PK graph 202. In disclosed embodiment, graph data can be represented using a World Wide Web Consortium (W3C) standard in the PK graph structure model 204. For example, one disclosed embodiment represents graph data using a Resource Description Framework (RDF), which is one language with an XML syntax that can be used for representing information about resources in the World Wide Web. In disclosed embodiment, multiple predefined RDF vocabularies are available, which are defined using the RDF Vocabulary Description Language, such as various RDF vocabularies available at <w3.org>. Table 1 provides an example RDF vocabulary as follows:

TABLE 1

| Reification Vocabulary |
| --- |
| • 1 rdf:Statement. rdf:Statement is an instance of rdfs:Class. ... |
| • 2 rdf:subject. rdf:subject is an instance of rdf:Property that is used to state the subject of a statement. ... |
| • 3 rdf:predicate. rdf:predicate is an instance of rdf:Property that is used to state the predicate of a statement. ... |
| • 4 rdf:object. |

Database system 200 includes advantages enabled by using the PK graph 202; for example, including effective and efficient natural language processing, entity and relationship extraction, and information integration. In a disclosed embodiment, the model or vocabulary 206 for describing entities in the PK graph 202 facilitates obtaining export data from the data service providers 210, 212, 214 in their defined data schema or representation and transforming the export data using a target vocabulary that can be any chosen standard (e.g., an existing standard for music or any internally defined data representation schema of the database system 200. In a disclosed embodiment, the model or vocabulary 208 for defining permissions and secrecy of entities in the PK graph 202 enables populating and maintaining the PK graphs; for example, providing effective and efficient collection of all potential data sources (textual, visual, geolocation) for the user. Database system 200 can store the integrated PK graph 202, for example using cloud storage such as cloud environment of the computing environment 100 of FIG. 1.

Figure 3:
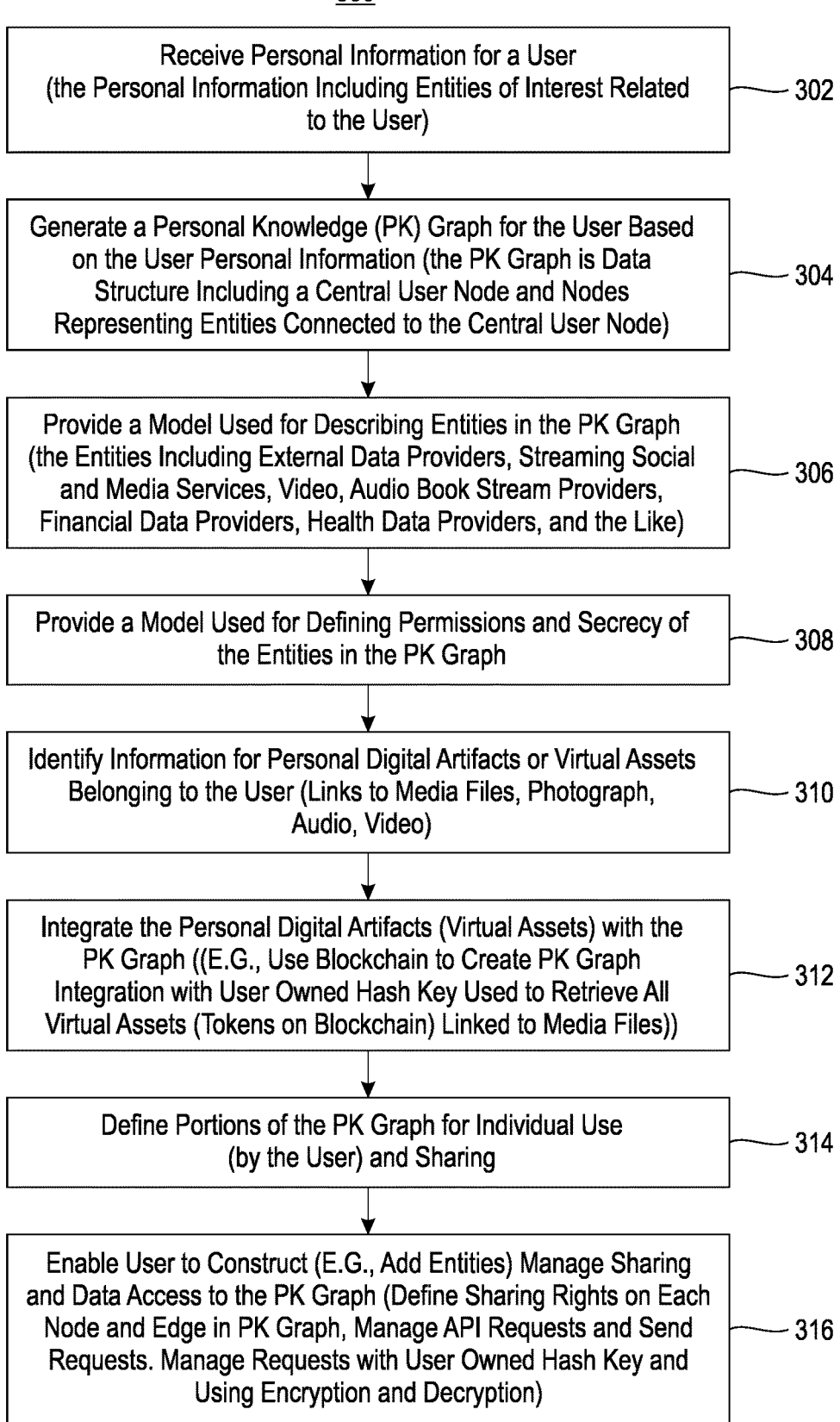
FIG. 3 is a flow chart of example operations of an example method for implementing a PK graph for a user of one or more disclosed embodiments.

FIG. 3 is a flow chart of example operations of an example method 300 for implementing a PK graph for a user of one or more disclosed embodiments. For example, method 300 can be implemented by the database system 200 in conjunction with the computer 101 of FIG. 1 with the PK Graph Control Component 182.

At block 302, system 200 receives personal information for a user. For example, in a disclosed embodiment, the personal information includes entities of interest related to the user, such as such as the service providers 210, 212, and 214 shown in FIG. 2. For example, in a disclosed embodiment, the personal information includes personal data identifying and specifically relating to the user such as an individual hash key or wallet address owned by the user. In a disclosed embodiment, the individual hash key or wallet address of the user may be used to retrieve their linked virtual assets and to maintain their integrated PK graph 202. At block 304, system 200 generates a PK graph for the user based on the user personal information. For example, the PK graph may be a triples graph data structure including a central user node and one or more nodes representing entities of interest to the user, where the entity nodes are connected to the central user node.

At block 306, database system 200 provides a model for describing entities in the PK graph 202, such as the model 206 shown in FIG. 2. For example, in a disclosed embodiment, the model 206 includes a specific defined data schema used for export data of the entities of interest (e.g., entities or data service providers 210, 212, 214) to be integrated into the PK graph 202. Use of the model 206 describing entities can enable database system 200 to perform operations for populating and maintaining the PK graphs 202 for example providing effective and efficient collection of potential data sources (textual, visual, geolocation, etc.) for the user. At block 308, system 200 provides the model 208 for defining permissions and secrecy of entities in the PK graph 202, such as shown in FIG. 2. For example, in a disclosed embodiment, the model 208 defining permissions and secrecy of the entities can enable database system 200 to perform operations for data sharing, for example providing sharing rights defined on each node and edge in the PK graph.

At block 310, database system 200 identifies information relating to personal digital artifacts or virtual assets belonging to the user. For example, the information can include links to documents, media files, photograph, audio and video files belonging to the user, such as files containing data that the user owns or retains a copyright. At block 312, database system 200 integrates the personal digital artifacts or virtual assets belonging to the user with the PK graph. For example, in a disclosed embodiment, database system 200 can integrate the personal digital artifacts with the PK graph using blockchain where the user's personal digital artifacts or virtual assets are tokens on the blockchain, which are linked to media files. In a disclosed embodiment, database system 200 enables the user to retrieve their virtual assets for example by using a hash key or wallet address owned by the user.

At block 314, database system 200 defines portions of the PK graph 202 for individual use (by the user) and sharing, for example, database system 200 enables the distinction between personal (individual use) and interpersonal (sharing) portions of the PK graph 202. At block 316, database system 200 enables the user to construct (e.g., add entities), and manage sharing and data access to the PK graph (e.g. define sharing rights on each node edge in the PK graph 202. Further, at block 316, database system 200 enables the user to manage API requests and send requests, and manage requests with the user owned hash key and using encryption and decryption with the user owned hash key. For example, database system 200 enables the user to grant access to another person or entity, such as by providing a key as digital signature for the other person or entity to access specific portions of the PK graph 202.

FIG. 4 illustrates example data ingesting operations of an example method 400 for implementing a PK graph for a user of one or more disclosed embodiments. As shown at block 402, system 200 starts operations to ingest user data to construct the integrated PK graph 202. In a disclosed embodiment, system 200 ingests user data obtained from all the data service providers, such as the external data service providers 210, 212, 214 shown in FIG. 2, to provide complete information integration to the PK graph 202. For example, user's pictures, social profile and posts can be downloaded from a given external data service provider. At block 404, system 200 generates a user request to download personal user data from a given external data provider and exports the personal user data from the data provider using a defined data schema or data representation of the given external data provider. For example, an existing standard vocabulary for music may be used by the given external data provider, such as available at <purl.org/ontology/mo/>. At block 406, system 200 transforms the export data from the external data provider in a target vocabulary. In a disclosed embodiment, the target vocabulary can be a chosen standard vocabulary; for example, the existing standard vocabulary for music or any internally defined data representation schema of the database system 200. At block 408, system 200 integrates the transformed export data into the PK graph 202. A resulting integrated PK graph 202 includes a collection of export data in all selected vocabularies, any internally designed extension and/or integration.

Figure 5:
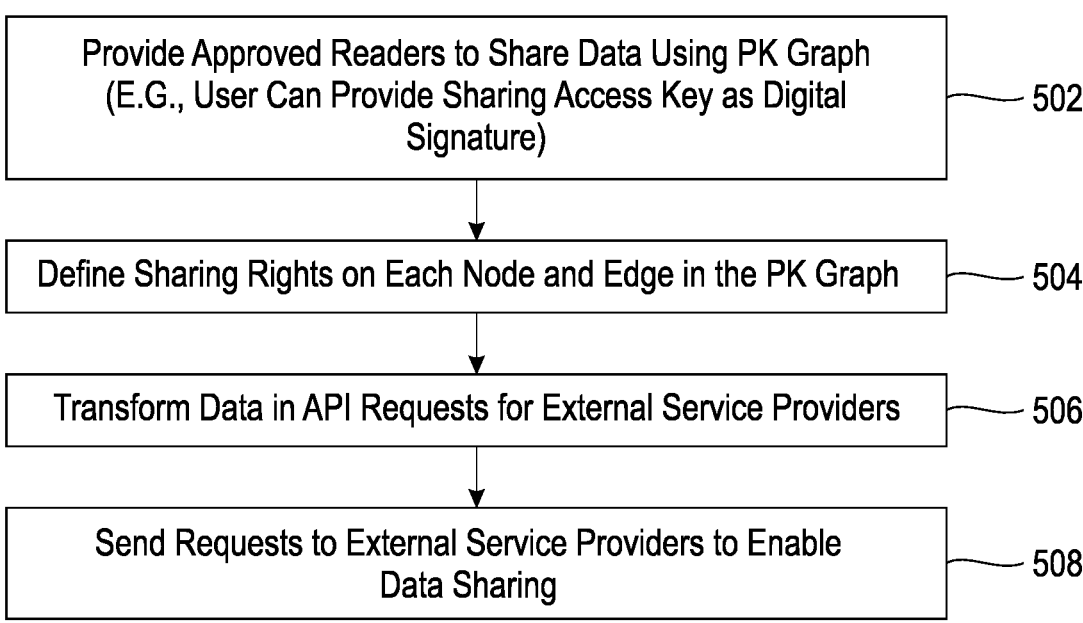
FIG. 5 is a flow chart of example data sharing operations of an example method for implementing a PK graph for a user of one or more disclosed embodiments.

FIG. 5 illustrates example data sharing operations of an example method 500 for implementing a PK graph for a user of one or more disclosed embodiments. As shown at block 502, system 200 starts operations for data sharing by providing approved readers to share data using the user's PK graph 202. In a disclosed embodiment, system 200 enables data sharing, for example using sharing rights defined on each node and edge of the PK graph 202 based on the model 208 for defining permissions and secrecy. For example, database system 200 enables the user to grant access to another person or entity to specific portions of the PK graph 202. For example, database system 200 enables the user to provide a sharing access key as a digital signature for the approved person or entity.

At block 504, system 200 defines sharing rights on each node and edge in the PK graph 202. For example, database system 200 enables the user to manage sharing and data access to the PK graph (e.g. define sharing rights on each node edge in the PK graph 202). At block 506, system 200 transforms data in API requests to external service providers, providing user data to request data sharing. At block 508, system 200 sends requests to external service providers to enable data sharing, for example populating and maintaining the user's PK graph 202.

FIG. 6 illustrates an example method 600 for implementing a PK graph for a user of one or more disclosed embodiments. At block 602, system 200 receives personal information for a user. For example, in a disclosed embodiment, the personal information includes entities of interest related to the user. At block 604, system 200 generates a PK graph for the user based on the user personal information and based on a PK graph model. The PK graph model defines a central node representing the user and one or more nodes representing entities of interest to the user, where each entity node is connected to the central user node by an edge in the PK graph. At block 606, system 200 ingests user data from each of the entities of interest based on a model describing the entities and a model defining permissions and secrecy of the entities. At block 608, system 200 integrates the user data from the entities of interest into the PK graph to provide an integrated PK graph 202 for the user.

While the foregoing is directed to embodiments of the present invention, other and further embodiments of the invention may be devised without departing from the basic scope thereof, and the scope thereof is determined by the claims that follow.

What is claimed is:

1. A method comprising:

receiving personal information data for a user, the personal information data identifying one or more entities of interest to the user;

generating a personal knowledge (PK) graph for the user based on the personal information data and a PK graph model, wherein the PK graph model defines a data structure for the PK graph, and the PK graph comprising a central node representing the user and one or more nodes representing the one or more entities of interest to the user;

ingesting, from the one or more entities of interest by a computer network module, user export data based on the personal information data of the user that identifies the one or more entities of interest to the user and a model describing the one or more entities of interest to the user;

obtaining, by the computer network module, personal digital artifacts belonging to the user; and integrating, using a blockchain, the user export data ingested from the one or more entities of interest and the personal digital artifacts into the PK graph, wherein the personal digital artifacts are tokens on the blockchain.

2. The method of claim 1, wherein integrating the personal digital artifacts with the PK graph further comprises using a hash key for the user for constructing and managing access to the PK graph using the hash key.

3. The method of claim 1, wherein integrating the user export data from the one or more entities of interest into the PK graph further comprises:

using a model for defining permissions and secrecy of the one or more entities of interest in the PK graph to integrate the user export data from a given entity.

4. The method of claim 1, wherein generating the PK graph for the user further comprises using a triples graph data structure, where each triple represents data in the integrated PK graph including a subject, a predicate, and an object.

5. The method of claim 1, wherein generating the PK graph for the user further comprises:

using a Resource Description Framework (RDF) language and wherein the model describing the one or more entities of interest comprises at least one of predefined RDF vocabularies or an internally defined data representation.

6. The method of claim 1, wherein ingesting the user export data from the one or more entities of interest based on the personal information data of the user that identifies the one or more entities of interest to the user and the model describing the one or more entities of interest to the user further comprises: encoding knowledge verification in the PK graph by the user.

7. The method of claim 1, wherein ingesting the user export data from the one or more entities of interest based on the personal information data of the user that identifies the one or more entities of interest to the user and the model describing the one or more entities of interest to the user further comprises: using data encryption and decryption for managing user sharing access to portions of the integrated PK graph.

8. The method of claim 1, wherein integrating the user export data from the one or more entities of interest into the PK graph further comprises:

enabling the user to grant access to one or more portions of the PK graph to at least one of another person or a given entity of the one or more entities of interest.

9. The method of claim 1, wherein the PK graph includes edges connecting nodes, and wherein integrating the user export data from the one or more entities of interest into the PK graph further comprises: defining sharing rights on the nodes and the edges in the PK graph.

10. A system, comprising:

a processor; and a memory, wherein the memory includes a computer program product configured to perform operations for implementing a Personal Knowledge (PK) graph for a user, the operations comprising:

receiving personal information data for the user, the personal information data identifying one or more entities of interest to the user;

generating a personal knowledge (PK) graph for the user based on the personal information data and a PK graph model, wherein the PK graph model defines a data structure for the PK graph, and the PK graph comprising a central node representing the user and one or more nodes representing the one or more entities of interest to the user;

ingesting, from the one or more entities of interest by a computer network module, user export data based on the personal information data of the user that identifies the one or more entities of interest to the user and a model describing the one or more entities of interest to the user;

obtaining, by the computer network module, personal digital artifacts belonging to the user; and integrating, using a blockchain, the user export data ingested from the one or more entities of interest and the personal digital artifacts into the PK graph, wherein the personal digital artifacts are tokens on the blockchain.

11. The system of claim 10, wherein integrating the user data from the one or more entities of interest into the PK graph further comprises:

using a model defining permissions and secrecy of the one or more entities of interest in the PK graph to integrate the user export data from a given entity.

12. The system of claim 10, wherein the PK graph includes edges connecting nodes, and wherein integrating the user export data from the one or more entities of interest into the PK graph further comprises: defining sharing rights on the nodes and the edges in the PK graph.

13. The system of claim 10, wherein integrating the user export data from the one or more entities of interest into the PK graph further comprises: enabling the user to grant access to one or more portions of the PK graph to at least one of another person or a given entity of the one or more entities of interest.

14. A computer program product for implementing a Personal Knowledge (PK) graph for a user, the computer program product comprising:

a non-transitory computer-readable storage medium having computer-readable program code embodied therewith, the computer-readable program code executable by one or more computer processors to perform an operation comprising:

receiving personal information data for the user, the personal information data identifying one or more entities of interest to the user;

generating a personal knowledge (PK) graph for the user based on the personal information data and a PK graph model, wherein the PK graph model defines a data structure for the PK graph, and the PK graph comprising a central node representing the user and one or more nodes representing the one or more entities of interest to the user;

ingesting, from the one or more entities of interest by a computer network module, user export data based on the personal information data of the user that identifies the one or more entities of interest to the user and a model describing the one or more entities of interest to the user;

obtaining, by the computer network module, personal digital artifacts belonging to the user; and integrating, using a blockchain, the user export data ingested from the one or more entities of interest and the personal digital artifacts into the PK graph, wherein the personal digital artifacts are tokens on the blockchain.

15. The computer program product of claim 14, wherein integrating the user export data from the one or more entities of interest into the PK graph further comprises:

using a model for defining permissions and secrecy of the one or more entities of interest in the PK graph to integrate the export data from a given entity.

16. The computer program product of claim 14, wherein the PK graph includes edges connecting nodes, and wherein integrating the user export data from the one or more entities of interest into the PK graph further comprises:

defining sharing rights on the nodes and the edges in the PK graph.

17. The computer program product of claim 14, wherein integrating the user export data from the one or more entities of interest into the PK graph further comprises:

enabling the user to grant access to one or more portions of the PK graph to at least one of another person or a given entity of the one or more entities of interest.

* * * * *